(12) United States Patent
Kou et al.

(10) Patent No.: US 11,096,090 B2
(45) Date of Patent: Aug. 17, 2021

(54) METHOD AND SYSTEM FOR NETWORK LOAD BALANCING IN VEHICLE ENTERTAINMENT SYSTEMS

(71) Applicants: CETC AVIONICS CO., LTD., Sichuan (CN); THALES CETC AVIONICS CO., LTD., Sichuan (CN)

(72) Inventors: Hanjun Kou, Sichuan (CN); Yi Liu, Sichuan (CN); Peng Huang, Sichuan (CN); Dake Liao, Sichuan (CN); Xihui Du, Sichuan (CN); Yang Yang, Sichuan (CN)

(73) Assignees: CETC AVIONICS CO., LTD., Sichuan (CN); THALES CETC AVIONICS CO., LTD., Sichuan (CN)

( * ) Notice: Subject to any disclaimer, the term of this patent is extended or adjusted under 35 U.S.C. 154(b) by 0 days.

(21) Appl. No.: 16/563,710

(22) Filed: Sep. 6, 2019

(65) Prior Publication Data

US 2020/0084665 A1 Mar. 12, 2020

(30) Foreign Application Priority Data

Sep. 6, 2018 (CN) .......................... 201811039567.4

(51) Int. Cl.
*H04W 28/08* (2009.01)
*H04L 29/08* (2006.01)
*H04L 29/12* (2006.01)

(52) U.S. Cl.
CPC ......... *H04W 28/08* (2013.01); *H04L 61/1511* (2013.01); *H04L 61/2015* (2013.01); *H04L 67/1023* (2013.01)

(58) Field of Classification Search
CPC .... H04W 28/08; H04W 8/26; H04L 67/1023; H04L 61/1511; H04L 61/2015; H04L 67/1036; H04L 67/1004

(Continued)

(56) References Cited

U.S. PATENT DOCUMENTS

| 6,701,329 B1* | 3/2004 | Esibov | ............. H04L 29/12066 |
| 2007/0117623 A1* | 5/2007 | Nelson | ................ G07F 17/3255 463/29 |

(Continued)

FOREIGN PATENT DOCUMENTS

| CN | 101764855 A | 6/2010 |
| CN | 101911600 A | 12/2010 |

(Continued)

OTHER PUBLICATIONS

Kinnear R Johnson M Stapp Cisco System K:"Virtual Subnet Selection Options for DHCPv4 and DHCPv6; rfc6607.txt", Internet Engineering Task Force, IETF; Standard, Internet Society (ISOC) 4, Rue Des Falaises CH-1205 Geneva, Switzerland, Apr. 30, 2012, pp. 1-26.

(Continued)

*Primary Examiner* — Kwang B Yao
*Assistant Examiner* — Syed M Bokhari
(74) *Attorney, Agent, or Firm* — Yue (Robert) Xu; Apex Attorneys at Law, LLP

(57) ABSTRACT

A system for network load balancing includes multiple access points (AP), multiple entertainment devices and a DHCP server. Each AP is connected to one entertainment devices and the DHCP server, each entertainment device includes a DNS server and a web server, and all DNS servers store and parse the same domain names. When the AP receives an access request of a wireless terminal, the DHCP server designates a DNS server in an entertainment device connected to the AP as a DNS server for the wireless terminal. When the AP receives a domain name parsing request of the wireless terminal, the designated DNS server parses the domain name into an IP address of a web server in the entertainment device including the DNS server. When the AP receives a web access request of the wireless termi- (Continued)

nal, the designated web server responds to the web access request via the AP.

8 Claims, 6 Drawing Sheets

(58) Field of Classification Search
USPC .......................................................... 370/230
See application file for complete search history.

(56) References Cited

U.S. PATENT DOCUMENTS

| | | | |
|---|---|---|---|
| 2009/0164614 A1 | 6/2009 | Christian et al. | |
| 2009/0172192 A1 | 7/2009 | Christian et al. | |
| 2010/0203938 A1* | 8/2010 | Alderucci ........... | G07F 17/3293 463/11 |
| 2011/0093522 A1 | 4/2011 | Chen et al. | |
| 2012/0178411 A1* | 7/2012 | Li ......................... | H04W 4/20 455/404.2 |
| 2013/0201978 A1* | 8/2013 | Iyer ...................... | H04W 84/12 370/338 |
| 2015/0089052 A1* | 3/2015 | Lin ........................ | H04L 69/04 709/224 |
| 2016/0279509 A1* | 9/2016 | Miller ................... | A63F 13/92 |
| 2018/0034643 A1* | 2/2018 | Yang ..................... | H04L 9/3263 |

FOREIGN PATENT DOCUMENTS

| | | |
|---|---|---|
| CN | 102577252 A | 7/2012 |
| CN | 104754065 A | 7/2015 |
| CN | 108063814 A | 5/2018 |
| EP | 1986386 A1 | 10/2008 |

OTHER PUBLICATIONS

Patrick Motorola BCS M:"DHCP Relay Agent Information Option; rfc3046.txt", Internet Engineering Task Force, IETF; Standard, Internet Society (ISOC) 4, Rue Des Falaises CH-1205 Geneva, Switzerland, Jan. 1, 2001.
Search Report dated Oct. 8, 2019 for European patent application No. 19195919.6, 8 pages.
First Office Action dated Dec. 31, 2020 for Chinese patent application No. 201811039567.4, English translation provided by Unitalen.

* cited by examiner

METHOD AND SYSTEM FOR NETWORK LOAD BALANCING IN VEHICLE ENTERTAINMENT SYSTEMS

CROSS REFERENCE TO RELATED APPLICATION

The present disclosure claims the priority to Chinese Patent Application No. 201811039567.4, titled "SYSTEM FOR NETWORK LOAD BALANCING", filed on Sep. 6, 2018 with China National Intellectual Property Administration, the content of which is incorporated herein by reference.

FIELD

The present disclosure relates to the field of network technology, and in particular, to a system for network load balancing.

BACKGROUND

Many vehicles, such as airplanes, trains, subways, cars, ships, and the like, provide entertainment systems for passengers, and such entertainment systems present multimedia resources to passengers through entertainment devices such as hanging displays, wall-mounted displays, and in-seat mounted displays. Typically, entertainment devices are connected via a wired network. FIG. 1 is a schematic diagram showing a connection relationship of hanging displays in an existing onboard entertainment system. In the example shown in FIG. 1, the hanging displays are connected with each other by a ring network.

Nowadays, wireless terminals (such as cellular phones, smart phones, tablet computers, laptop computers or other portable electronic devices) with wireless communication capabilities have become quite common. People are accustomed to wirelessly accessing multimedia resources through their own wireless terminals, but the network bandwidth resources and the processing capacity of the devices on the airplane are limited.

Therefore, load balancing is required on access of passengers.

SUMMARY

It is an object of the present disclosure to provide a system that is capable of balancing network load. In this regard, the present disclosure provides a system for network load balancing, including: multiple access points, multiple entertainment devices and a DHCP (Dynamic Host Configuration Protocol) server, each of the access points is connected to one of the entertainment devices, all the access points are connected to the DHCP server, each of the entertainment devices includes a DNS (Domain Name System) server and a web server, and all DNS servers store and parse the same domain names;

when the access point receives an access request of a wireless terminal, the DHCP server allocates a designated DNS server and returns the designated DNS server to the wireless terminal via the access point, the designated DNS server being a DNS server included in the entertainment device connected to the access point;

when the access point receives a domain name parsing request of the wireless terminal, the designated DNS server parses a domain name into an IP address of a designated web server and returns the IP address of the designated web server to the wireless terminal via the access point, the designated web server being a web server included in the entertainment device connected to the access point;

when the access point receives a web access request initiated for the domain name by the wireless terminal, the designated web server responds to the web access request via the access point.

Optionally, the process from when the access point receives the access request of the wireless terminal to the DHCP server allocates the designated DNS server and returns the designated DNS server to the wireless terminal includes the following steps 1-1 to 1-6.

In step 1-1, the access point receives a DHCP request message sent by the wireless terminal to the DHCP server;

in step 1-2, the access point adds an identifier of the access point to the DHCP request message, and sends a modified DHCP request message to the DHCP server;

in step 1-3, the DHCP server receives the modified DHCP request message and reads the identifier of the access point;

in step 1-4, the DHCP server designates, based on the identifier of the access point, the DNS server included in the entertainment device connected to the access point as the DNS server for the wireless terminal;

in step 1-5, the DHCP server returns a DHCP response message; and in step 1-6, the access point forwards the DHCP response message.

Optionally, the system further includes an access controller, the access controller is configured to store a correspondence relationship between the access points and wireless terminals accessing the access points; and the process from when the access point receives the access request of the wireless terminal to the DHCP server allocates the designated DNS server and returns the designated DNS server to the wireless terminal via the access point includes the following steps 2-1 to 2-8.

In step 2-1, the access point receives a DHCP request message sent by the wireless terminal to the DHCP server;

in step 2-2, the access point forwards the DHCP request message to the DHCP server;

in step 2-3, the DHCP server receives the DHCP request message and reads an identifier of the wireless terminal from the DHCP request message.

in step 2-4, the DHCP server sends a query request to the access controller, requesting to query an identifier of the access point accessed by the wireless terminal based on the identifier of the wireless terminal;

in step 2-5, the access controller returns the identifier of the access point accessed by the wireless terminal;

in step 2-6, the DHCP server designates the DNS server in the entertainment device connected to the access point as the DNS server for the wireless terminal, based on the identifier of the access point accessed by the wireless terminal;

in step 2-7, the DHCP server returns a DHCP response message; and in step 2-8, the access point forwards the DHCP response message.

Preferably, the access point is located in the entertainment device.

Preferably, the DHCP server is located in the entertainment device.

Preferably, all the web servers store the same multimedia resources.

Optionally, one of the web servers stores multimedia resources, and the other web servers are able to access the web server storing the multimedia resources.

Optionally, each of the web servers stores respective multimedia resources, and the web servers are able to access the multimedia resources of each other.

Preferably, the system is applied in a vehicle.

Optionally, the entertainment device is a hanging display, a wall-mounted display or an in-seat mounted display.

Compared with the conventional technology, by practicing the present disclosure, passengers can wirelessly access multimedia resources without occupying wired resources, and balance of network traffic and load can be achieved.

DETAILED DESCRIPTION

In order for those skilled in the art to better understand the technical solutions of the present disclosure, the present disclosure will be further described in detail with reference to the accompanying drawings and specific embodiments hereinafter.

Figure 1:
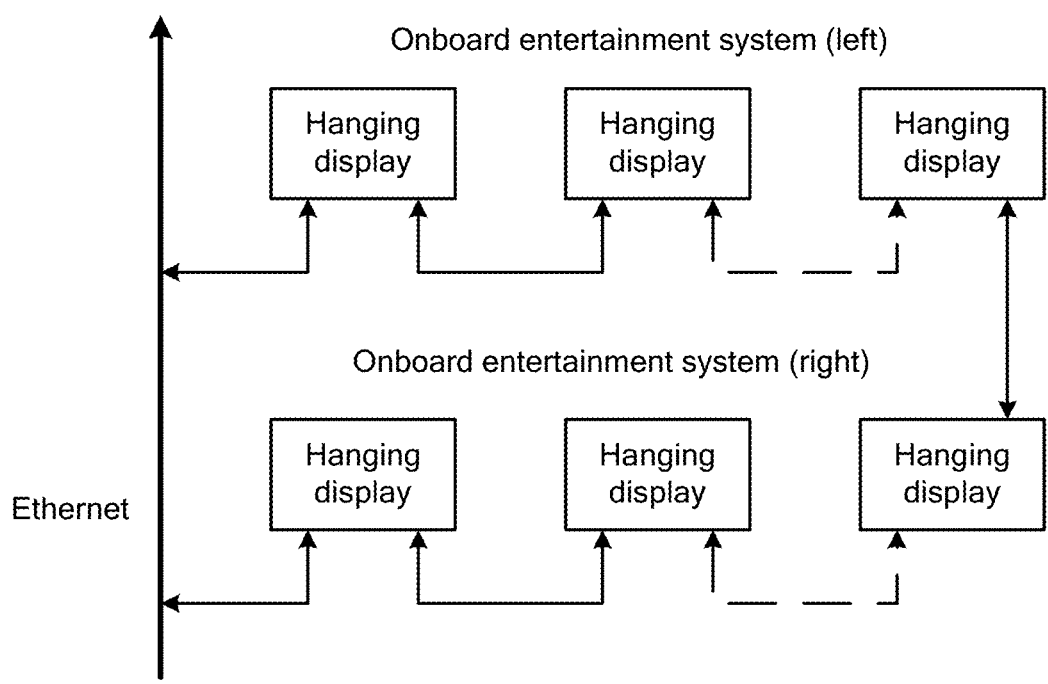
FIG. 1 is a schematic diagram showing a connection relationship of hanging pendant display in an existing onboard entertainment system.
Figure 2:
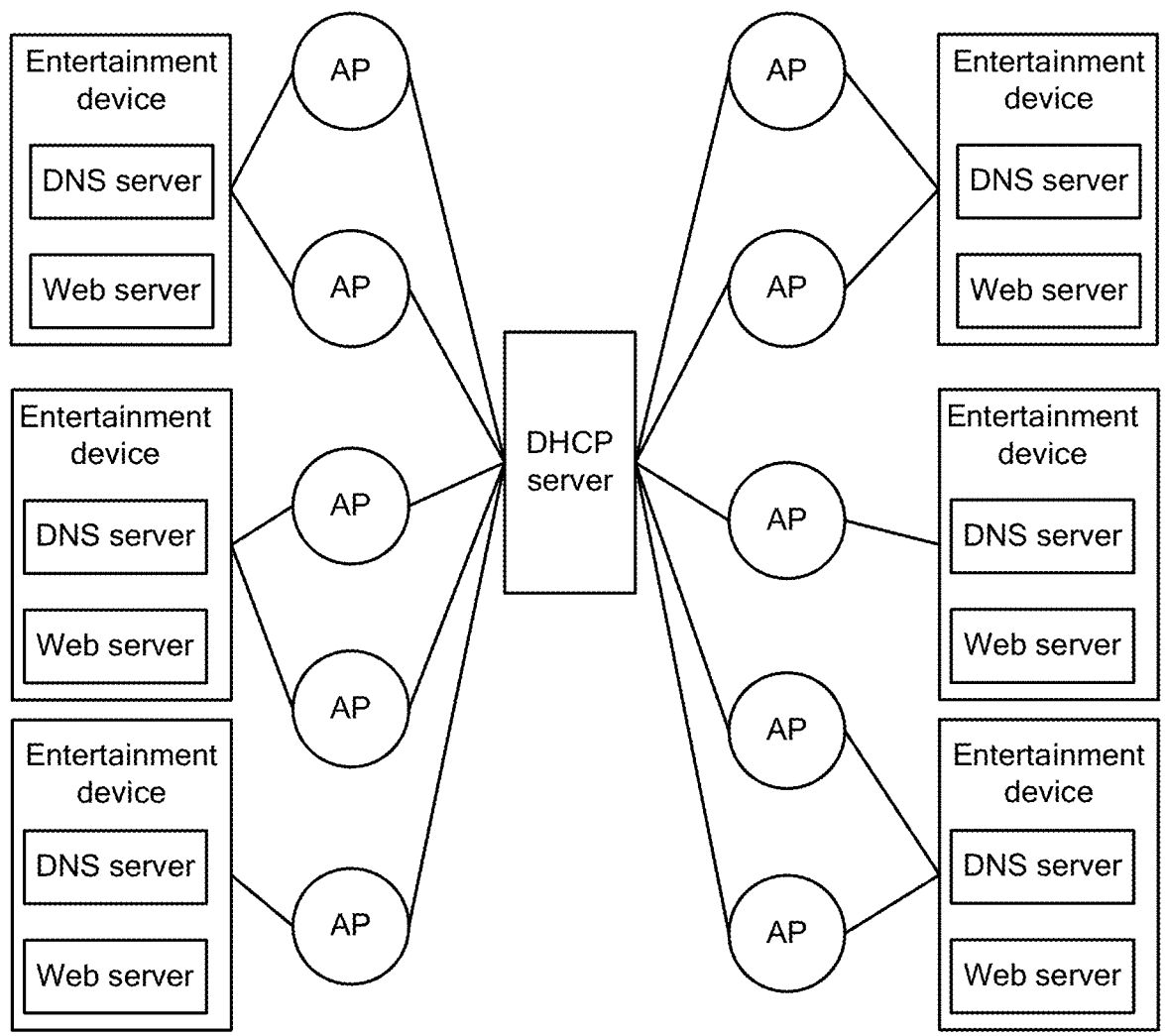
FIG. 2 is a block diagram of a system according to an embodiment of the present disclosure.

The present disclosure provides a system for network load balancing. In an embodiment, as shown in FIG. 2, the system according to the present disclosure includes: multiple access points (hereinafter also referred to as AP), multiple entertainment devices and a DHCP server, each of the APs being connected to one of the entertainment devices, and all the APs being connected to the DHCP server. Each entertainment device includes a DNS server and a web server, and all DNS servers store and parse the same domain names.

Figure 3:
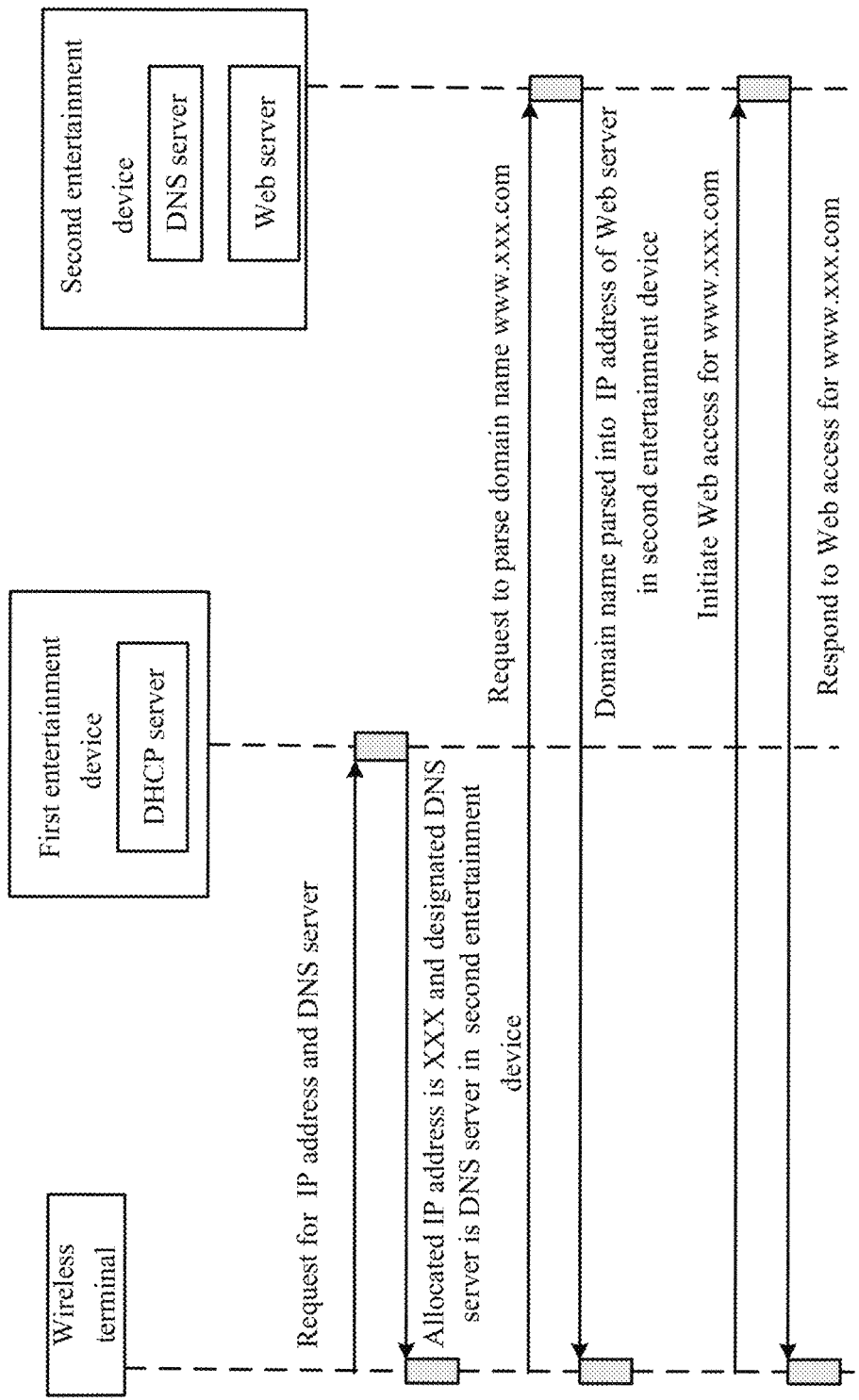
FIG. 3 is a flowchart of providing multimedia resources to a wireless terminal by a system by a system according to an embodiment of the present disclosure.

A wireless terminal of a passenger accesses the system through the AP, thereby wirelessly accessing resources in the system. FIG. 3 illustrates an example of a flow of providing multimedia resources to the wireless terminal by the system according to an embodiment of the present disclosure. In the example shown in FIG. 3, the system of the present disclosure includes a first entertainment device and a second entertainment device, a DHCP server is provided in the first entertainment device, an AP is provided in the second entertainment device, and the wireless terminal accesses the system by the AP in the second entertainment device. The process for the system to provide multimedia resources to the wireless terminal includes steps A to F.

In step A, the wireless terminal initiates an access request to the system through the AP in the second entertainment device, requesting an IP address and a DNS server for itself.

In step B, the DHCP server informs the wireless terminal via the AP in the second entertainment device that the IP address allocated to the wireless terminal is XXX and the DNS server designated for the wireless terminal is the DNS server in the second entertainment device.

In step C, the wireless terminal initiates a domain name parsing request to the DNS server in the second entertainment device via the AP in the second entertainment device, requesting the DNS server to parse the domain name www.xxx.com.

In step D, the DNS server in the second entertainment device informs the wireless terminal via the AP in the second entertainment device that the domain name is parsed into an IP address of a web server in the second entertainment device.

In step E, the wireless terminal initiates a web access request for the domain name www.xxx.com to the web server in the second entertainment device via the AP in the second entertainment device.

In step F, the web server in the second entertainment device responds to the access of the wireless terminal via the AP in the second entertainment device.

At this point, the wireless terminal is able to wirelessly access the multimedia resources of the system.

It should be noted that the system described above may be used in a vehicle, the vehicle may be an airplane, a train, a subway, a car or a ship, and the entertainment device may be a hanging display, a wall-mounted display, or an in-seat mounted display, which are not limited in the present disclosure. In a preferred embodiment, the entertainment device is a hanging display in an airplane. The present disclosure is not limited to application in vehicles, rather, it can also be used, for example, in airport lounges or other office or entertainment venues that require wireless access to resources. In addition, although the AP is provided in the entertainment device in the above example, the present disclosure is not limited thereto. The AP may be located in or outside the entertainment device, and the number of APs may be more than, equal to, or less than the number of entertainment devices. In addition, although in the above example, the number of DHCP servers is one and the DHCP server is provided in the entertainment device, the present disclosure is not limited thereto, the number of DHCP servers may be more than one, and the DHCP may be located in or outside the entertainment.

The above examples describe the system of the present disclosure in terms of interaction between the wireless terminal and the system. Hereinafter, operations of the system will be described from its own perspective.

When the AP of the system receives an access request of the wireless terminal, the DHCP server allocates an IP address and a designated DNS server, and returns the IP address and the designated DNS server to the wireless terminal via the AP The designated DNS server is a DNS server included in the entertainment device connected to the AP;

when the AP receives a domain name parsing request of the wireless terminal, the designated DNS server parses a domain name into an IP address of a designated web server and returns the IP address of the designated web server to the wireless terminal via the AP The designated web server is a web server included in the entertainment device connected to the AP; and when the AP receives a web access request initiated for the domain name by the wireless terminal, the designated web server responds to the web access request via the AP.

By setting the AP in the present disclosure, the wireless terminal of the passenger can establish a wireless connection with the system and initiate a request to the system both via the AP. The DHCP server of the system of the present disclosure designates the DNS server for the wireless terminal based on the AP accessed by the wireless terminal, and the DNS server parses the domain name inputted by the wireless terminal into the IP address of the web server storing the multimedia resources, and finally the web server responds to the web access request of the wireless terminal to provide the wireless terminal of the passenger with corresponding multimedia resources, thereby enabling the passenger to wirelessly access the multimedia resources provided by the system.

The entertainment devices of the present disclosure are connected by a wired network to transmit control service data between the entertainment devices. Each entertainment device and the wireless terminal are connected through a wireless network to provide multimedia resources to users. Therefore, the system of the present disclosure does not occupy the wired network bandwidth when providing multimedia resources to the users, thereby not affecting normal communications between the entertainment devices in the system.

In addition, for a vehicle that can provide multimedia resources to passengers by entertainment devices only through a wired network, multimedia resources can be provided to passengers through a wireless network by simply adding a chip to the existing entertainment devices to implement functions of the AP, DHCP server, DNS server and web server. Therefore, the technical solution of the present disclosure is particularly suitable for upgrading of old vehicles.

According to the present disclosure, multiple web servers are provided and access of the wireless terminal is distributed to the multiple web servers through the DHCP server and the DNS servers, so that the multiple web servers can share the network traffic and the load, thereby achieving the balance of the network traffic and the load. Specifically, on one hand, access to the same domain name of all the wireless terminals is distributed to multiple web servers according to the present disclosure, achieving load balancing; and on the other hand, the network transmission traffic caused by all wireless terminals is distributed to multiple wireless network channels, thereby realizing balance of network traffic.

In addition, a wireless device typically choose the closest AP to establish a connection therewith because such a connection has the strongest signal and data transmission is the most stable. The entertainment devices in the vehicle are usually evenly distributed in the vehicle. Therefore, by providing the APs in evenly distributed entertainment devices, the wireless access of the wireless devices can be evenly distributed to all the entertainment devices.

In addition, a web server is designated to a wireless terminal through a DHCP server and a DNS server, the web server being a web server in an entertainment device in which the AP accessed by the wireless terminal is located. The web server will always respond to the wireless terminal after the completion of the allocation, thus ensuring that the web server allocated to the wireless terminal is fixed and optimal.

In an embodiment, the multimedia resources are located on one of the web servers, and the other web servers can access the web server storing the multimedia resources by a wire or wireless connection. In another embodiment, all web servers constitute a cluster file system which stores the multimedia resources, and each web server can access the multimedia resources in the cluster.

In a preferred embodiment, web servers of all the entertainment devices store the same multimedia resources. By having the web servers of all entertainment devices store the same multimedia resources, the bandwidth required for communications between the web servers as well as the calculations required for data exchange between the web servers can be saved, contributing to achieve balance of network traffic and load. Moreover, in the context of vehicles, bandwidth resources and computing resources are often scarce resources, and thus the system according to this embodiment is particularly advantageous as an entertainment system in a vehicle.

The above beneficial effects all rely on a basis that the DNS server can be designated to the wireless terminal through the AP accessed by the wireless terminal, while it is still a technical difficulty to assign a DNS server to a wireless terminal through an AP accessed by the wireless terminal, and the reasons are described as follows.

Figure 4:
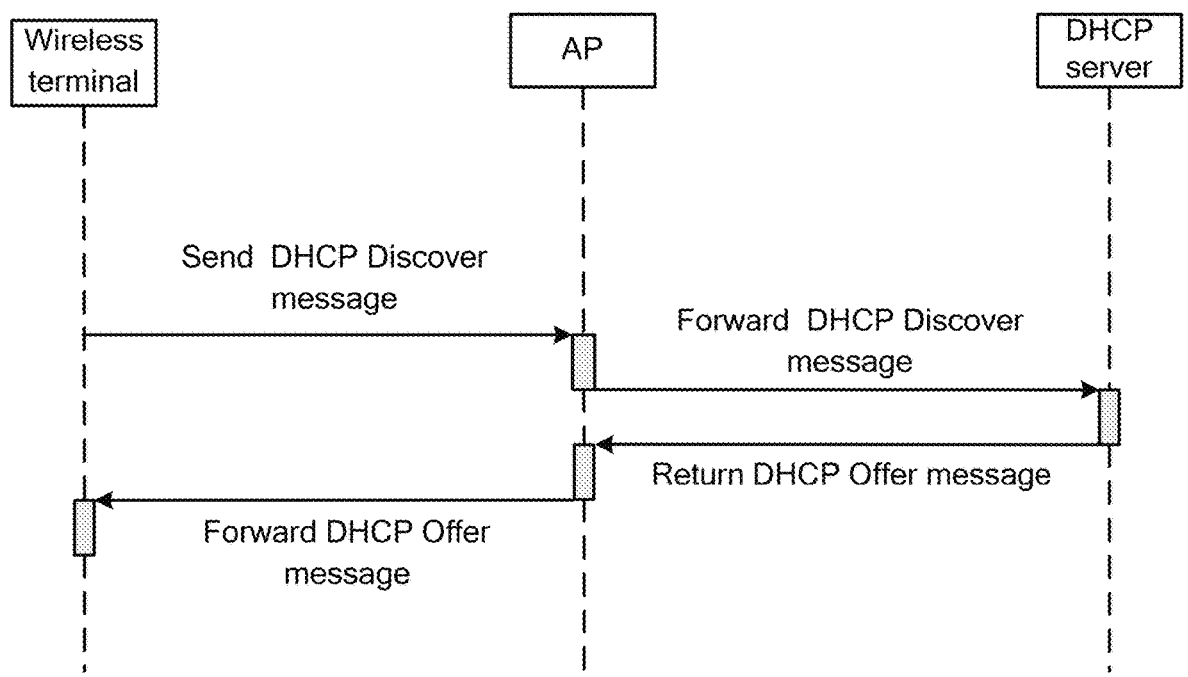
FIG. 4 is a flow chart of communications between an AP and a DHCP in the conventional technology.

FIG. 4 is a flow chart of communications between an AP and a DHCP server in the conventional technology. Under the current DHCP protocol standard, when a wireless terminal, as a DHCP client, sends a DHCP message to a DHCP server, there is no unified method for the wireless terminal to identify in the DHCP message the AP currently accessed by the wireless terminal. As a result, when receiving the DHCP message sent by the wireless terminal, the DHCP server cannot know by which AP the wireless terminal accesses the system. Even if the DHCP client supports reporting information on AP accessed by the wireless terminal by modifying the DHCP protocol standard, it is unrealistic to update the DHCP clients on all wireless terminal devices to the new client.

In order to solve the above problems, the present disclosure proposes the following two methods.

In the first method, the AP is first modified to meet the following conditions:

1) the AP can identify a DHCP request message (i.e., a DHCP Discover message and a DHCP Request message) when forwarding any network message sent by a wireless terminal.

2) when finding that the wireless terminal currently sends a DHCP request message, the AP modifies the DHCP request message by adding a self-defined DHCP option (also referred to as a DHCP option) to the message, designates an identifier of the AP, for example, a MAC address, as the value of this option, and then forwards the modified DHCP request message.

Secondly, the DHCP server is configured to:

1) check whether there is a DHCP option added by an AP in a received DHCP request message (that is, a DHCP Discover message or a DHCP Request message).

2) if there is no option added by an AP in the received DHCP request message, designate in a DHCP response message (i.e., DHCP Offer message or DHCP ACK message) a default DNS server as the DNS server for the wireless terminal; and 3) if there is an option added by an AP in the received DHCP request message, the value of the option is considered to be an identifier of the AP accessed by the wireless terminal, designate in the DHCP response message a DNS server in an entertainment device connected to the AP as the DNS server for the wireless terminal.

Figure 5:
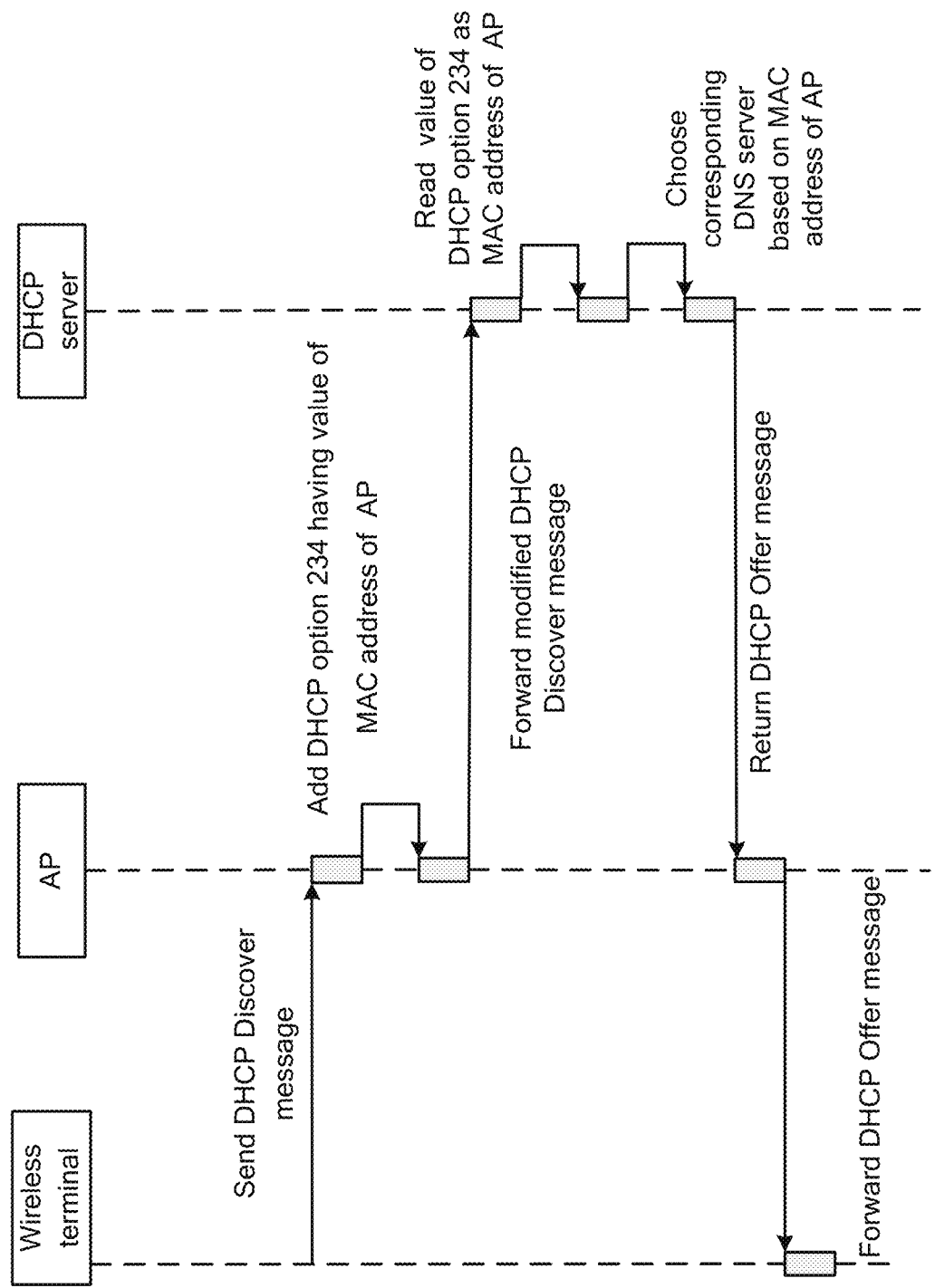
FIG. 5 is a flowchart of providing a DNS server for a wireless terminal by a system according to an embodiment of the present disclosure.

FIG. 5 illustrates a flow of determining a DNS server through an AP accessed by a wireless terminal by a system according to an embodiment of the present disclosure. Referring to FIG. 5, when the wireless terminal sends a DHCP request message (DHCP Discover message is taken as an example in FIG. 5) to the AP, the AP does not directly forward the DHCP request message to the DHCP server, but adds an MAC address of the AP to the DHCP request message (DHCP option 234 is taken as an example in FIG. 5). Then the DHCP server reads the MAC address of the AP, and accordingly adds a DNS server designated for the wireless terminal in the DHCP response message (DHCP Offer message is taken as an example in FIG. 5). Finally the DHCP response message is forwarded via the AP to inform the wireless terminal of the DNS server designated for the wireless terminal, thereby realizing the allocation of the DNS server through the AP accessed by the wireless terminal.

The above examples describe the system of the present disclosure in terms of interaction between the wireless terminal and the system. Hereinafter, operation of the system will be described from its own perspective. The process from when the AP receives the access request of the wireless terminal to the DHCP server allocates the designated DNS server and returns the designated DNS server to the wireless terminal via the AP includes the following steps 1-1 to 1-6.

In Step 1-1, the AP receives a DHCP request message sent by the wireless terminal to the DHCP server;

in step 1-2, the AP adds an identifier of the AP to the DHCP request message, and sends the modified DHCP request message to the DHCP server;

in step 1-3, the DHCP server receives the modified DHCP request message and reads the identifier of the AP;

in step 1-4, the DHCP server designates, based on the identifier of the AP, the DNS server included in the entertainment device connected to the AP as the DNS server for the wireless terminal;

in step 1-5, the DHCP server returns a DHCP response message; and in step 1-6, the AP forwards the DHCP response message.

In the second method, the system further includes an access controller (hereinafter, the access controller is also referred to as AC), and the AC is used to store a correspondence relationship between the APs and wireless terminals accessing the APs.

In addition, in the second method, the AC is modified to:

1) provide an external query interface. The query interface uses an identifier of a wireless terminal, for example, a MAC address of the wireless terminal, as a query keyword, and returns an identifier of an AP accessed by the wireless terminal, such as a MAC address of the AP; and the DHCP server is modified to:

1) when receiving a DHCP request message sent by a wireless terminal as a DHCP client, obtain an identifier of the wireless terminal, for example, a MAC address of the wireless terminal;

2) initiate a query request to the AC with the identifier of the wireless terminal as a query keyword;

3) if the AC does not respond or an AP identifier returned by the AC is invalid, designate in a DHCP return message a default server as a DNS server for the wireless terminal; and 4) if the AP identifier returned by the AC is valid, designate in the DHCP return message a DNS server in an entertainment device connected to the AP as the DNS server for the wireless terminal.

Figure 6:
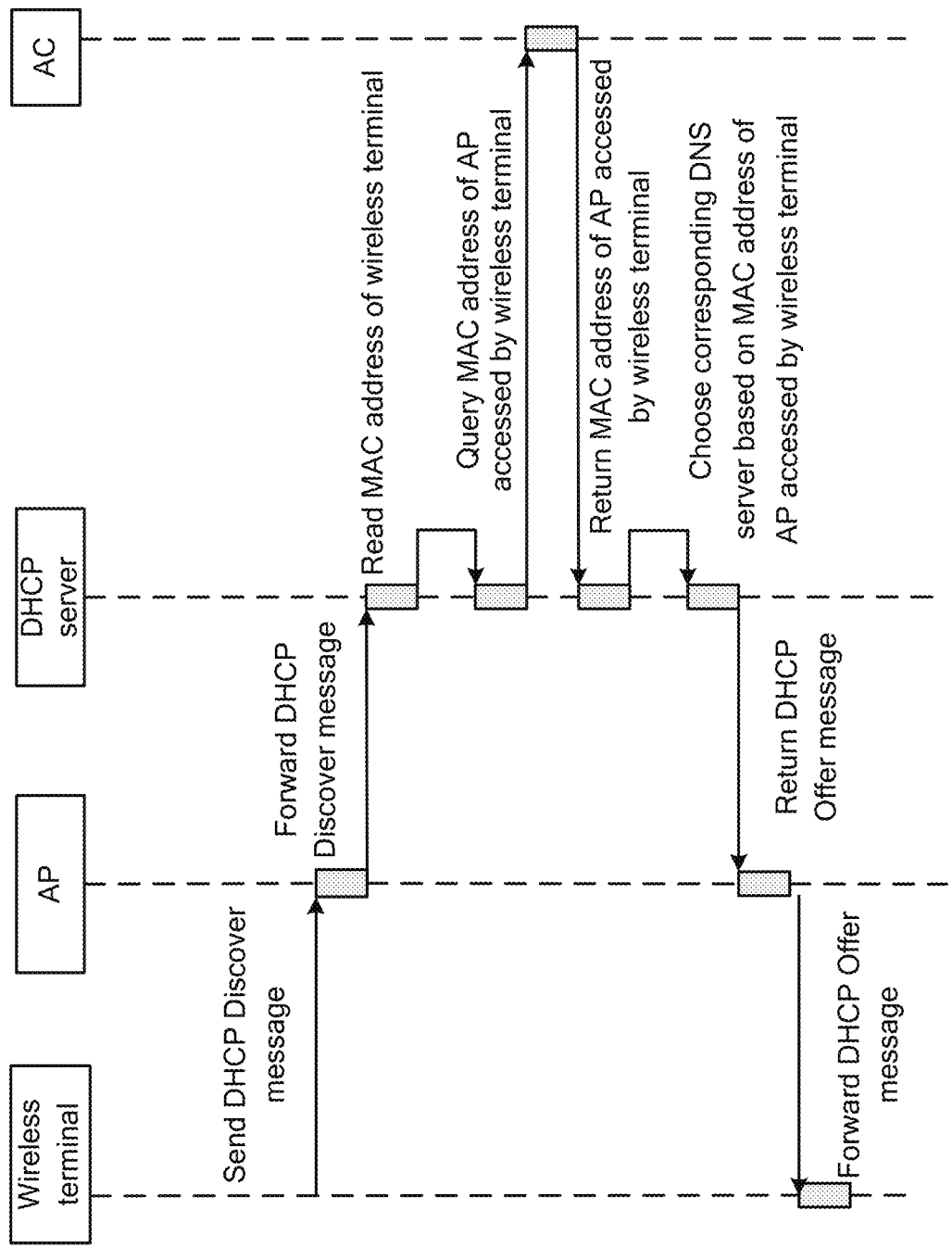
FIG. 6 is a flow chart of providing a DNS server for a wireless terminal by a system according to another embodiment of the present disclosure.

FIG. 6 shows a flow of determining a DNS server through an AP accessed by a wireless terminal by a system according to another embodiment of the present disclosure. Referring to FIG. 6, when the wireless terminal sends a DHCP request message to the AP (DHCP Discover message is taken as an example in FIG. 6), the AP receives the DHCP request message and forwards the message to the DHCP server, and the DHCP server reads an identifier (MAC address is taken as an example in FIG. 6) of the wireless terminal from the message and sends a query request to the AC, requesting to query an identifier (MAC address is taken as an example in FIG. 6) of the AP accessed by the wireless terminal based on the identifier of the wireless terminal. Then the AC sends the identifier of the AP accessed by the wireless terminal to the DHCP server, the DHCP server takes a DNS server in an entertainment device connected to the AP as the DNS server designated for the wireless terminal, and returns a DHCP response message (DHCP Offer message is taken as an example in FIG. 6) to the AP Finally, the DHCP response message is forwarded via the AP to inform the wireless terminal of the DNS server designated for the wireless terminal, thereby realizing the allocation of the DNS server through the AP accessed by the wireless terminal.

The above examples describe the system of the present disclosure in terms of interaction between the wireless terminal and the system. Hereinafter, operation of the system will be described from its own perspective. The process from when the AP receives the access request of the wireless terminal to the DHCP server allocates the designated DNS server and returns the designated DNS server to the wireless terminal via the AP includes the following steps 2-1 to 2-8.

In step 2-1, the AP receives a DHCP request message sent by the wireless terminal to the DHCP server;

in step 2-2, the AP forwards the DHCP request message to the DHCP server;

in step 2-3, the DHCP server receives the DHCP request message and reads an identifier of the wireless terminal from the DHCP request message;

in step 2-4, the DHCP server sends a query request to the AC, requesting to query an identifier of the AP accessed by the wireless terminal based on the identifier of the wireless terminal;

in step 2-5, the AC returns the identifier of the AP accessed by the wireless terminal;

in step 2-6, the DHCP server designates the DNS server in the entertainment device connected to the AP as the DNS server for the wireless terminal, based on the identifier of the AP accessed by the wireless terminal;

in step 2-7, the DHCP server returns a DHCP response message; and in step 2-8, the AP forwards the DHCP response message.

Through the above two methods, allocation of a DNS server to a wireless terminal through an AP accessed by the wireless terminal can be realized by the present disclosure.

The invention claimed is:

1. A system for network load balancing, comprising: a plurality of access points, a plurality of entertainment devices and a DHCP server, wherein each of the access points is connected to one of the entertainment devices, all the access points are connected to the DHCP server, each of the entertainment devices comprises a DNS server and a web server, and all DNS servers store and parse the same domain names; when the access point receives an access request of a wireless terminal, the DHCP server allocates a designated DNS server and returns the designated DNS server to the wireless terminal via the access point, the designated DNS server being a DNS server comprised in the entertainment device connected to the access point; when the access point receives a domain name parsing request of the wireless terminal, the designated DNS server parses a domain name into an IP address of a designated web server and returns the IP address of the designated web server to the wireless terminal via the access point, the designated web server being a web server comprised in the entertainment device connected to the access point; when the access point receives a web access request initiated for the domain name by the wireless terminal, the designated web server responds to the web access request via the access point, and the system further comprises an access controller configured to store a correspondence relationship between the access points and wireless terminals accessing the access points, wherein the access point is configured to receive a DHCP request message sent by the wireless terminal to the DHCP server and forward the DHCP request message to the DHCP server; and the DHCP server is configured to receive the DHCP request message and read an identifier of the wireless terminal from the DHCP request message, send a query request to the access controller, requesting to query an identifier of the access point accessed by the wireless terminal based on the identifier of the wireless terminal, designate, based on the identifier of the access point accessed by the wireless terminal, the DNS server in the entertainment device connected to the access point as the DNS server for the wireless terminal, in response to the access controller returning the identifier of the access point accessed by the wireless terminal, and return a DHCP response message to the access point, for the access point to forward the DHCP response message to the wireless terminal.

2. The system according to claim 1, wherein the access point is located in the entertainment device.

3. The system according to claim 1, wherein the DHCP server is located in the entertainment device.

4. The system according to claim 1, wherein all web server store the same multimedia resources.

5. The system according to claim 1, wherein one of the web servers stores multimedia resources, and the other web servers are able to access the web server storing the multimedia resources.

6. The system according to claim 1, wherein each of the web servers stores respective multimedia resources, and the web servers are able to access the multimedia resources of each other.

7. The system according to claim 1, wherein the system is applied in a vehicle.

8. The system according to claim 2, wherein the entertainment device is a hanging display, a wall-mounted display or an in-seat mounted display.

* * * * *